UNITED STATES PATENT OFFICE.

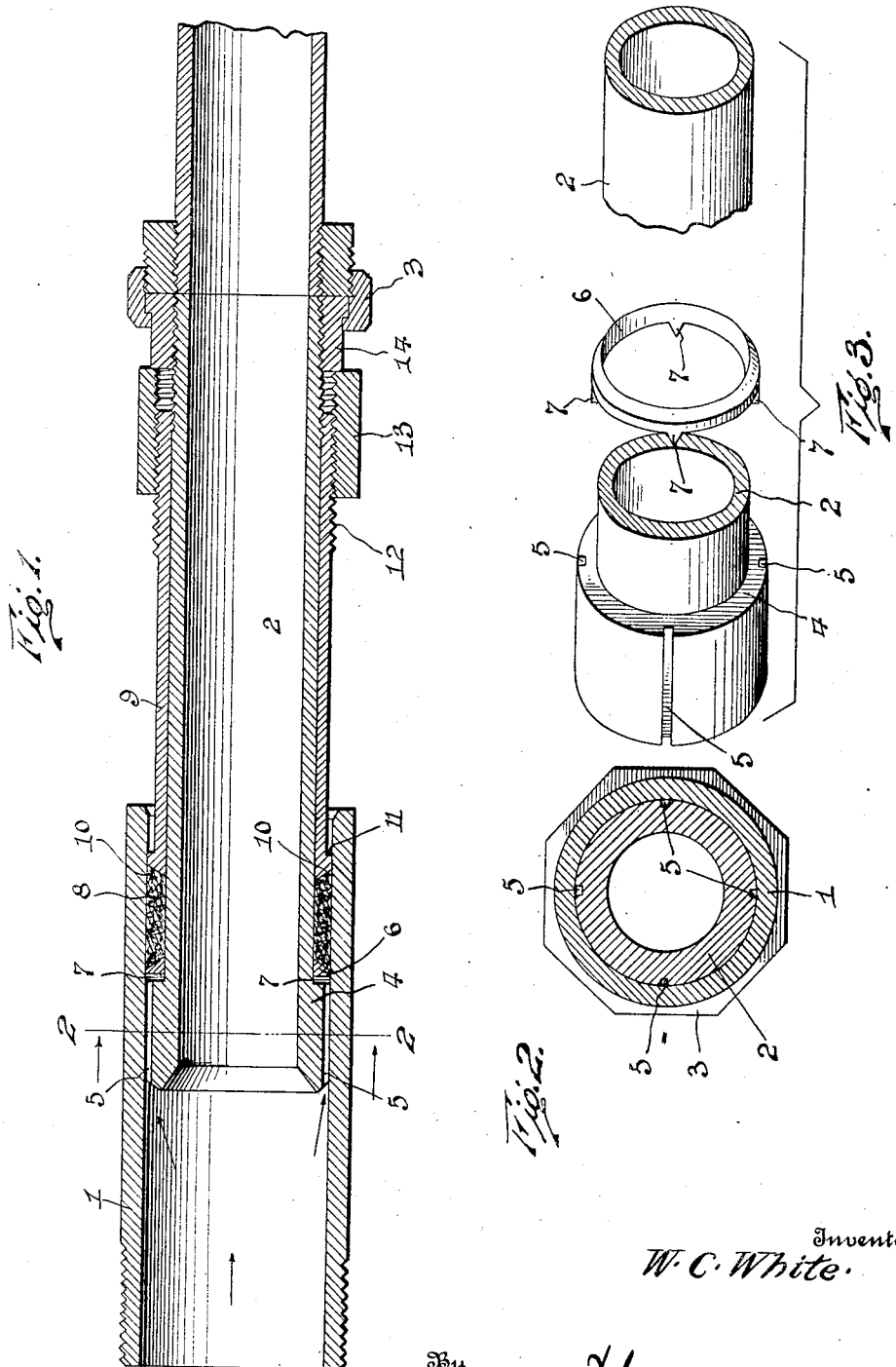

WALTER C. WHITE, OF PITTSBURGH, PENNSYLVANIA, ASSIGNOR TO INTERNATIONAL COUPLERS COMPANY, OF LOS ANGELES, CALIFORNIA, A CORPORATION OF CALIFORNIA.

TELESCOPIC PIPE-JOINT.

1,334,007.   Specification of Letters Patent.   Patented Mar. 16, 1920.

Application filed March 22, 1916, Serial No. 85,915. Renewed July 17, 1919. Serial No. 311,682.

*To all whom it may concern:*

Be it known that I, WALTER C. WHITE, a citizen of the United States, residing at Pittsburgh, in the county of Allegheny and State of Pennsylvania, have invented certain new and useful Improvements in Telescopic Pipe-Joints, of which the following is a specification.

This invention relates to pipe joints and has for its object the provision of means whereby the sections of the joint may be permitted to telescope one within the other without detracting from the fluid-retaining qualities of the joint. One object of the invention is to provide means whereby the pressure of the fluid in the pipes will be utilized to compress a gasket so as to prevent escape of the fluid through the joint, and a further object of the invention is to provide means whereby the compression of the gasket may be controlled so as to compensate for wear and permit the pipe sections to have easy relative movement at all times.

The several stated objects and other objects which will incidentally appear as the description of the invention proceeds are attained in the use of such a construction as is illustrated in the accompanying drawings, and the invention resides in certain novel features which will be particularly pointed out in the claims following the description.

In the annexed drawings:

Figure 1 is a longitudinal section of one form of pipe joint embodying my present improvements;

Fig. 2 is a transverse section on the line 2—2 of Fig. 1;

Fig. 3 is a detail perspective view of the gasket ring and the pipe section upon which the said ring is seated.

While my invention is intended more particularly for train pipes, it is applicable to all pipes in which it is necessary to provide for longitudinal extension or contraction.

In the drawings, the reference numeral 1 indicates an outer pipe, and the reference numeral 2 indicates an inner pipe which may be constructed in two members or sections connected by a union or coupling 3 to facilitate the assembling of the parts. The end of the pipe 2 is of greater external diameter than the main portion of the pipe thereby providing an annular flange 4 having longitudinal grooves 5 therein. Fitting upon the reduced portion of the pipe 2 is a gasket ring 6 which is provided at intervals with lugs 7 adapted to bear against the inner radial surface of the flange 4 which consequently forms a seat for the said lugs and the said lugs are so disposed as to space the ring from the flange whereby a chamber is formed communicating with the grooves 5 so that the fluid passing through the said grooves will exert its pressure directly against the outer radial face of the said ring. It will be noted that, in the illustrated construction, the ring is beveled or inclined on its inner end which forms a seat for the gasket 8 which is fitted around the pipe 2 against the ring. Upon the pipe 2, I mount a follower sleeve 9 which has its inner end 10 bearing against the edge of the gasket 8 and the end portion of this sleeve is of greater external diameter than the body of the same, as shown at 11, so that, while the follower will have a sliding engagement with the pipe section, the area of the contacting surfaces is minimized and friction thereby reduced. The inner end of the follower is preferably beveled, as shown, and it will be understood that the particular form of the bevel is immaterial and may be varied at will. The outer end of the follower sleeve is threaded, as shown at 12 in the present illustration, to be engaged by an adjusting collar or ring 13 which bears against the abutment presented by the member 14 of the union 3 or an annular flange on the pipe 2. It will be readily understood that by rotating the collar 13 in the proper direction, the sleeve 9 will be adjusted against the gasket 8 so as to compress the same longitudinally and effect radial expansion thereof so as to compensate for wear upon the gasket and maintain the same in close contact with the opposed surfaces of the pipes.

The member 14 may be, and in practice frequently is, a lock nut. It is sometimes preferred to effect the desired adjustment by turning the said nut, the collar 13 being omitted and the end of the sleeve bearing directly against the nut.

It will be readily noted from the foregoing description, taken in connection with the accompanying drawings, that I have provided an exceedingly simple and inexpensive pipe joint which will permit the pipe sections to telescope or have relative longitudinal movement without permitting leakage of the fluid in the pipes. The gasket ring 6 will be exposed to the direct action of the fluid which will tend to force the ring against the gasket which may be of any desired flexible material, the result being that the gasket will be compressed longitudinally between the ring and the end of the sleeve or follower 9 and, consequently, will be expanded radially against the pipe sections and make the joint fluid-tight. The gasket ring, gasket and follower with the adjusting collar 13 will be assembled upon the pipe 2 before the union or coupling 3 is applied so that the parts may be very easily and quickly brought into their proper relative positions. This arrangement also facilitates the disassembling of the parts in the event that repairs are necessary.

Having thus described my invention, what I claim as new is:

1. A pipe joint comprising pipes, one fitting telescopically within the other, the inner pipe terminating in a channeled end forming a shoulder and slidably engaging the outer pipe, a follower on the inner pipe exerting pressure against said shoulder, a gasket ring on the inner pipe engaging said shoulder, and a gasket between said follower and said gasket ring and bearing against the outer pipe.

2. The combination of inner and outer pipes telescopically fitted together, a follower on the inner pipe extending into the outer pipe, a gasket disposed between opposed surfaces of inner pipe and follower and bearing against the outer pipe, and a slidable gasket ring fitted between the inner and outer pipes and bearing against the gasket.

3. The combination of inner and outer pipes telescopically fitted together, an abutment on one of said pipes, a seat on one of the pipes, a gasket ring adjacent said seat, a compressible gasket on said pipe seated against said ring, a follower slidably fitted upon the pipe having the abutment and having a terminal between the pipes forming a seat for the gasket, and an adjusting device engaging said follower and bearing against the said abutment.

4. The combination of inner pipes fitting within an outer pipe, the innermost pipe having an annular flange at its end telescopically engaging said outer pipe and provided with longitudinal grooves in its outer surface, a gasket ring fitting around the said pipe and having spacing lugs arranged to bear upon said flange, and a gasket fitted around the said pipe and against the said gasket ring, and means on said pipe to compress the same between said inner pipes and the said outer pipe.

5. The combination of inner pipes, telescopically fitted in an outer pipe, the innermost pipe having an annular flange at its end telescopically engaging said outer pipe and provided with longitudinal grooves in its outer surface, a gasket ring fitted upon the innermost pipe and having triangular lugs on one face whereby to form a pressure chamber between said flange and said gasket ring, around said innermost pipe, a gasket fitted between said pipes and against the outermost pipe, and the said gasket ring, and means for holding the gasket against the gasket ring.

6. The combination of inner pipes fitted telescopically within an outer pipe, a gasket ring on the innermost pipe, a gasket seated against the gasket ring, one of said pipes forming a follower slidably fitted on said innermost pipe, and terminating in an end slidably fitted to the outer pipe and forming an opposing seat for said gasket, the balance of the outer surface of the follower being in spaced relation to the inner surface of the outer pipe.

7. The combination of inner and outer pipes, the inner pipe telescopically fitting within the outer pipe and provided at its end with an annular flanged bearing surface fitted against the inner surface of the outer pipe, longitudinal grooves being formed in the circumferential surface of said flange, a gasket ring fitted slidably upon the inner pipe and having one radial surface provided with tapered longitudinally projecting lugs arranged to bear against the adjacent radial face of the flange on the inner pipe, the opposite face of said gasket ring being beveled, a gasket fitted between the inner and outer pipes and against the said beveled face of the gasket ring, a follower sleeve slidably mounted on the inner pipe and having one end bearing against the gasket, said follower sleeve being laterally expanded at one extremity to bear against the inner surface of the outer pipe and being otherwise spaced from said outer pipe, an abutment on the inner pipe, and an adjusting collar bearing against said abutment and engaging the said follower sleeve.

In testimony whereof I affix my signature.

WALTER C. WHITE. [L. S.]